Feb. 10, 1925. 1,526,060
G. GEISENDORFER
ATTACHMENT FOR DEFLATED PNEUMATICALLY TIRED VEHICLE WHEELS
Filed March 22, 1923 2 Sheets-Sheet 1

Inventor:
George Geisendorfer
by Atty.

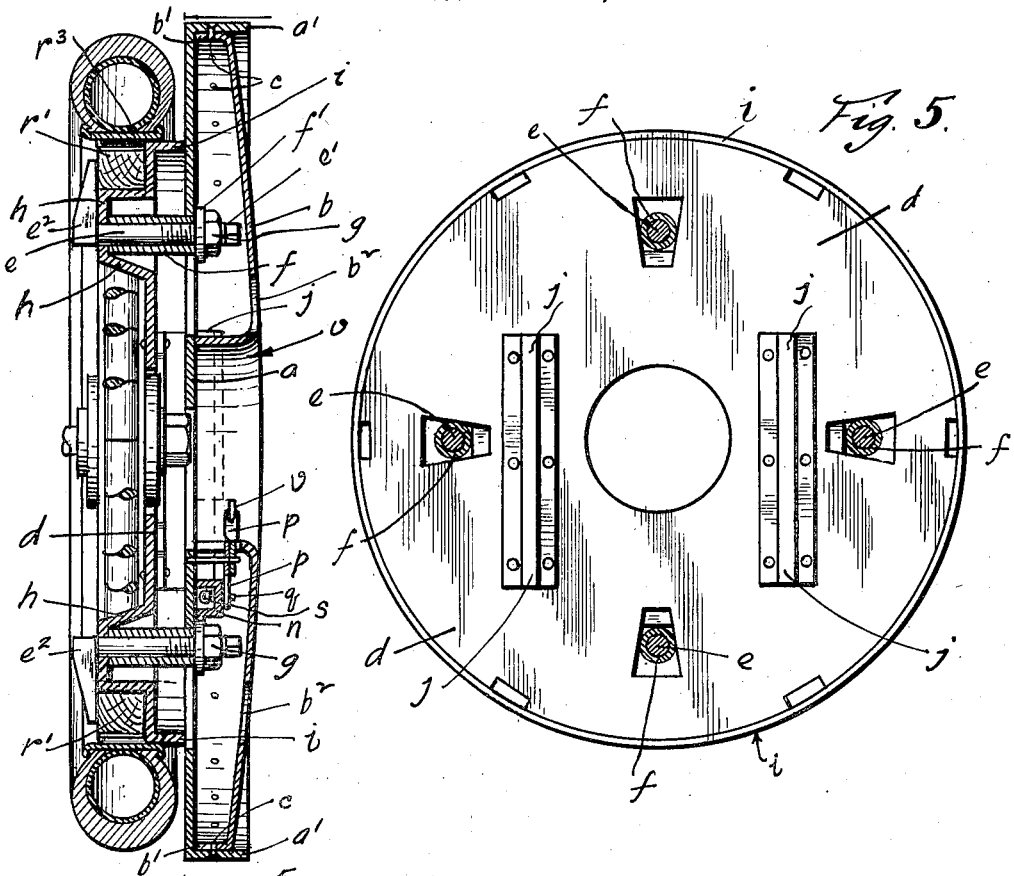
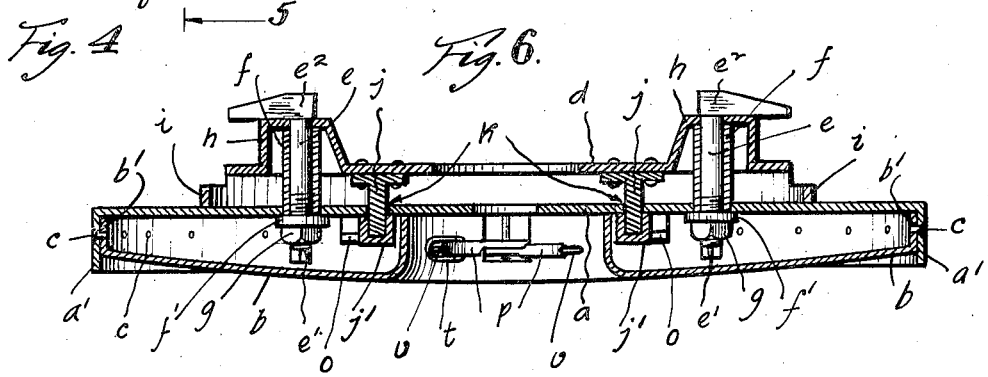
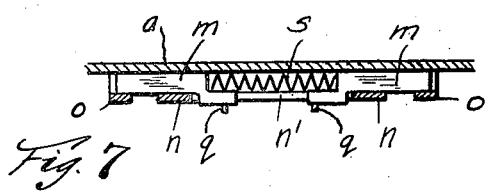

Patented Feb. 10, 1925.

1,526,060

UNITED STATES PATENT OFFICE.

GEORGE GEISENDORFER, OF WARRENTON, OREGON.

ATTACHMENT FOR DEFLATED PNEUMATICALLY-TIRED VEHICLE WHEELS.

Application filed March 22, 1923. Serial No. 626,952.

*To all whom it may concern:*

Be it known that I, GEORGE GEISENDORFER, a citizen of the United States, and a resident of the city of Warrenton, county of Clatsop, and State of Oregon, have invented a new and useful Improvement in Attachments for Deflated Pneumatically-Tired Vehicle Wheels, of which the following is a specification.

My invention relates to vehicle wheels which are provided with pneumatic tires.

The object of my invention is to provide a handy attachment for a wheel of this type which will take care of the accidental deflation of its tire. That is to say, instead of taking off the wheel, or its tire, my attachment is designed to be affixed to the outer face of the wheel, and will function to support the weight of the vehicle, with the deflated tire of the wheel spaced from the ground.

To this end my invention comprises a member adapted for affixing over the outer face of the vehicle wheel, means for fastening such member to said wheel, an auxiliary wheel slidably carrying said member, being of greater diameter than the tire of the vehicle wheel, releasable automatic means for securing said vehicle wheel in place concentric with said member, whereby when said member is arranged eccentrically to the auxiliary wheel and thus in registration with the vehicle wheel for fastening thereto, the rotation of the latter will cause said auxiliary wheel to become positioned concentrically with the vehicle-wheel and will support the weight of the adjacent portion of the vehicle.

The details of the construction and the operation of my attachment are illustrated in the accompanying drawings.

In these drawings:

Fig. 4 is a section taken on the line 4—4 of Fig. 3 and shows the automobile wheel locked in position to my auxiliary wheel and concentric therewith;

Fig. 5 is a section taken on the line 5—5 of Fig. 4;

Fig. 6 is a section taken on the line 6—6 of Fig. 3 except that the automobile wheel has been removed; and Fig. 7 is a section taken on the line 7—7 of Fig. 3 and shows a detail of construction.

Figures 1, 2:
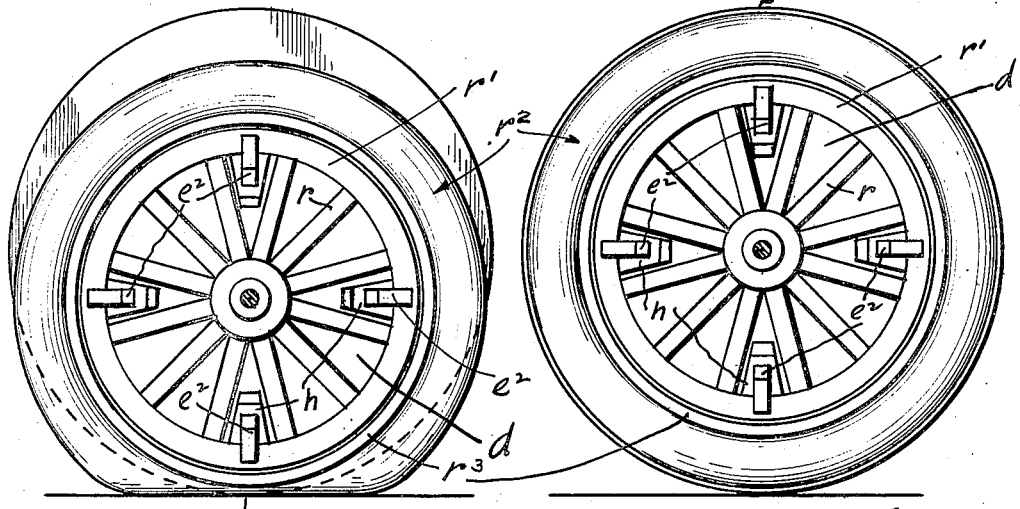
Fig. 1 is a diagrammatic view of an automobile wheel with a flat tire with my auxiliary wheel in position and clamped thereto.
Fig. 2 is a similar diagrammatic representation showing the locked wheels rotated 180° and the automobile wheel lifted from off the road.

My auxiliary wheel is constructed with an annular disk $a$ of greater diameter than the automobile wheel $r$ to which it is attached. An annular cover plate $b$ is mounted over the exterior of the annular disk $a$. A peripheral flange $a'$ is provided on the member $a$ and a corresponding bearing flange $b'$ is provided on the member $b$. The flange $b'$ is adapted to underlie and bear against the flange $a'$. The peripheral surface of the flange $a'$ is flat and adapted to form the tread of the wheel or else being adapted to have a rubber tire (not shown) pressed thereon to form the wearing surface. The flanges are fastened together by countersunk headed screws $c$ the heads of which lie flush with the surface of the flange $a'$. A plate $d$ of lesser diameter than the automobile wheel $r$ is slidably attached to the plate $a$ by L-headed bolts $e$ which extend thru the plates $d$ and $a$. Spacers $f$ and washers $f'$ are provided so that when the nut $g$ on the threaded portion is rotated the clamping action will not bind these two plates and prevent this sliding action. The plates $d$ have integral projections $h$ raised from their outer surfaces and a down turned peripheral flange $i$ which bears against the plate $a$. Parallel tongues $j$ are fastened on the inner face of the plates $d$ and bear in parallel slots $k$ one on each side of the center of the plate $a$. The slots $k$ are as much longer than the parallel tongues $j$ as it is wished to move the plate $d$ relative to the plate $a$. That is the tongues $j$ in the slots $k$ serve to limit the degree of relative motion of these plates with each other. Removable clips $j'$ are fastened on the tongues $j$ and bear against the plate $d$ on each side of the slots $k$ and thus serve to hold the disk $a$ and plate $d$ in spaced relationship but prevent them from being moved away from each other. Elongated slots $l$ are provided in the disk $a$ through which the bolts $f$ extend. These slots are elongated as much in relation to the diameter of the bolt as the slots $k$ are longer than the parallel tongues $j$ and thus said elongation permits the relative displacement of the plates with each other. Latch bars $m$ are arranged to project across the paths of motion of the tongues in the longer guide slots. They are slidably held by a grooved clip $n$ mounted on the disk $a$ between the parallel guide slots $k$, the clip being arranged so that the bars slide in a path normal to that of the tongues $j$. Keepers $o$ mounted on the disk $a$ on the outside of the guide slots $k$ are mounted in alinement with the clip $n$ and thus serve to support the outer end of these latching members when extended across the path of motion of the tongues $j$. Fulcrumed co-acting levers $p$ serve as operating mechanism for the latch bars $m$. These levers have elongated holes $p'$ thru which the projections $q$ on the latch bars $m$ extend. A compression spring $s$ mounted between the two latch bars serves to force the bars across the path of motion of the tongues $j$ and the fulcrumed co-acting levers serve to retract the bars so that they will lie wholly within the clip $n$. It can be seen that if the latching bars are in inoperative position, that is wholly within the grooved member $n$, the tongues $j$ extending thru the disk $a$ are free to be moved in the slots $k$ and thus the plate $d$ is permitted to move relatively to the disk $a$. When the latching bars are in outward or operative position, however, the latch bars hold the tongues in place and thus prevent lineal displacement of said tongues.

Figure 3:
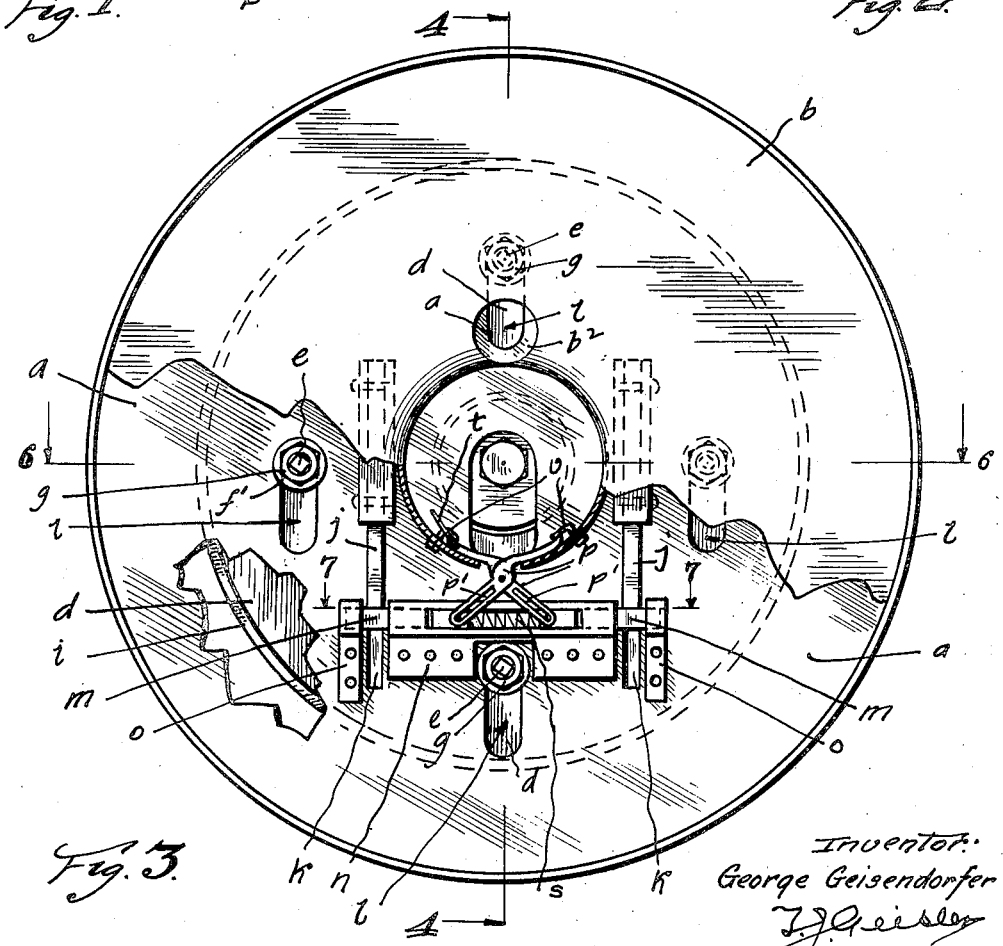
Fig. 3 is a side elevation of my auxiliary wheel with parts broken away to show interior mechanism.

Referring to Fig. 3, if the latching bars $m$ are drawn inwardly the tongues $j$ are free to move downwardly until they strike the bottom of the slots $k$. When the latching bars $m$ are in their outward position as shown in Fig. 3, the tongues are held at the upper end of the slot $k$ and the two plates are held against movement relatively to each other. I have provided a link $t$ which is fastened to one of the co-acting levers $p$ and is adapted to be slipped over the other lever thus to hold the levers together, which will result in the bars $m$ being held within the clip $n$ and in inoperative position. Retaining members $u$ are provided in the concentric depression $v$ in the cover plates $b$ which fit over the ends of the co-acting levers $p$ and thus serve as auxiliary means to hold the latch bars $m$ in operative position. These members can be rotated slightly so that the levers can be forced together when it is desired to force the latch bars out of the path of motion of the tongues $j$.

My device is arranged to be attached to an automobile wheel $r$ by first moving the locking members $u$ from over the ends of the levers $p$ and forcing the co-acting levers together against the compression spring $s$ and locking them in position by the link $t$. The tongues $j$ can then move downward as shown in Fig. 3 in the slots $k$ so that the plate $d$ can be arranged in eccentric position. The L-headed bolts $e$ then register with the openings between the spokes in the automobile wheel $r$ and can be turned relatively therewith by their squared ends $e'$ and can be forced thru and then turned to grip the felly $r'$ of the automobile wheel. The heads $e'$ of the bolts $e$ register with the holes $b^2$ in the cover $b$ when the cover is arranged eccentrically with the disc $a$, so as to provide access to said bolts. The shoulder $i$ fits under the rim $r^3$ and as the nut $g$ draws the head $e^2$ of the L-headed bolt into position the shoulder $i$ is forced tightly under the rim $r^3$ and thus the wheel is locked tightly in position. The link $t$ is then removed from the ends of the co-acting levers $p$ and the compression spring $s$ forces the latch bars $m$ against the tongues $j$.

When the car is driven forward one-half of a revolution of the wheels as shown by the points $x$ in Figs. 1 and 2, the tongues $j$ will be forced to the opposite end of the slot $k$. As soon as the bars $m$ are beyond the end of the tongues $j$ the spring $s$ will force them outwardly into position in the keepers $o$. Thus the continued rotation of the wheel will not result in movement of the tongues $j$ in the slots $k$ because the latch members $m$ hold the plate $d$ concentric with the disk $a$. Because the disk $a$ is larger in diameter than the vehicle wheel the action of this device will space the tire $r^2$ of the wheel free from the road and will thus relieve the weight therefrom and the load of that portion of the vehicle will be supported by the disk.

I claim:

1. An attachment of the character described, for a vehicle having wheels with pneumatic tires, comprising a member adapted for affixing over the outer face of the vehicle wheel, means for fastening such member to said wheel, an auxiliary wheel of greater diameter than the tire of the vehicle wheel, slidably carrying said member, releasable means for securing said member concentrically to the auxiliary wheel, the release of which permits said member to become eccentric therewith and in registration with the vehicle wheel for fastening thereto, and upon the rotation of the latter said auxiliary wheel will become positioned concentrically with the vehicle-wheel and secured thereto to support the weight of the adjacent portion of the vehicle.

2. A wheel attachment of the character described, comprising a plate of lesser diameter than the wheel, such plate provided with protuberances adapted for seating on the interior face of the felly of the wheel, an annular disk of greater diameter than the wheel, the disk being provided with parallel guide slots, one on each side of its center, the plate being provided with members bearing in said guide slots but shorter in length than said slots, bolts holding the wheel on the protuberances, spring actuated latch bars arranged to be projected across the paths of motion of said ribs in said guide slots, means for retracting said bars, whereby the plate may be arranged concentrically with the annular disk and be thus in registration with the wheel for fastening thereto and upon the rotation of the latter, said disk will be positioned concentrically with said wheel and will project beyond the rim of the wheel and thus support the weight of that portion of the vehicle 3. A wheel attachment of the character described, comprising a plate of lesser diameter than the wheel, such plate provided with protuberances adapted for seating on the interior face of the felly of the wheel, an annular disk of greater diameter than the wheel provided with a peripheral flange, an annular cover provided with a bearing flange on its periphery, adapted to bear against the interior face of the peripheral flange of said disk, the disk being provided with parallel guide slots, one on each side of its center, the plate being provided with members bearing in said guide slots but shorter in length than said slots, bolts holding the wheel on the protuberances, spring actuated latch bars arranged to be projected across the paths of motion of said ribs in said guide slots, means for retracting said bars, whereby the plate may be arranged concentrically with the annular disk and be thus in registration with the wheel for fastening thereto and upon the rotation of the latter, said disk will be positioned concentrically with said wheel and will project beyond the rim of the wheel and thus support the weight of that portion of the vehicle.

4. A wheel attachment of the character described, comprising a plate of lesser diameter than the wheel, such plate provided with protuberances adapted for seating on the interior face of the felly of the wheel, an annular disk of greater diameter than the wheel, provided with a peripheral flange, an annular cover provided with a bearing flange on its periphery, said cover being provided with a concentric depression, the disk being provided with parallel guide slots, one on each side of its center, the plate being provided with members bearing in said guide slots but shorter in length than said slots, bolts holding the wheel on the protuberances, spring actuated latch bars arranged to be projected across the paths of motion of said ribs in said guide slots, coacting levers pivoted between said cover and said disk for retracting said bars, whereby the plate may be arranged concentrically with the annular disk and be thus in registration with the wheel for fastening thereto and upon the rotation of the latter, said disk will be positioned concentrically with said wheel and will project beyond the rim of the wheel and thus support the weight of that portion of the vehicle.

5. A wheel attachment of the character described, comprising a plate of lesser diameter than the wheel, such plate provided with protuberances adapted for seating on the interior face of the felly of the wheel, an annular disk of greater diameter than the wheel, the disk being provided with parallel guide slots, one on each side of its center, the plate being provided with members bearing in said guide slots but shorter in length than said slots, L-headed bolts holding the wheel on the protuberances, the heads of said bolts being adapted to engage the felly of the wheel, spring actuated latch bars arranged to be projected across the paths of motion of said ribs in said guide slots, means for retracting said bars, whereby the plate may be arranged concentrically with the annular disk and be thus in registration with the wheel for fastening thereto and upon the rotation of the latter, said disk will be positioned concentrically with said wheel and will project beyond the rim of the wheel and thus support the weight of that portion of the vehicle.

6. A wheel attachment of the character described, comprising a plate of lesser diameter than the wheel, such plate provided with protuberances adapted for seating on the interior face of the felly of the wheel, an annular disk of greater diameter than the wheel, the disk being provided with parallel guide slots, one on each side of its center, the plate being provided with members bearing in said guide slots but shorter in length than said slots, L-headed bolts extending thru said disk and said protuberances of said plate having spacing sleeves on said bolts which bear on the interior of said protuberances and extend thru the orifices for said bolts provided in said disk, nuts on said bolts, spring actuated latch bars arranged to be projected across the paths of motion of said ribs in said guide slots, means for retracting said bars, whereby the plate may be arranged concentrically with the annular disk and be thus in registration with the wheel for fastening thereto and upon the rotation of the latter, said disk will be positioned concentrically with said wheel and will project beyond the rim of the wheel and thus support the weight of that portion of the vehicle.

GEO. GEISENDORFER.